UNITED STATES PATENT OFFICE 2,006,187

MANUFACTURE OF PIGMENTS

George F. A. Stutz, Palmerton, Pa., assignor to The New Jersey Zinc Company, New York, N. Y., a corporation of New Jersey No Drawing. Application January 23, 1931, Serial No. 510,764

6 Claims. (Cl. 134—78)

This invention relates to the manufacture of pigments requiring heat treatment for imparting adequate pigment properties thereto, such for example as lithopone, zinc sulfide, and the like. The invention aims to provide certain improvements in the method of carrying out the heat treatment of such pigments.

The heat treatment of lithopone, zinc sulfide and similar pigments has heretofore involved a muffling or calcining operation in the course of which the pigment is heated to a temperature of from about 650 to 900° C. in an inert atmosphere at approximately atmospheric pressure. It has been customary to dry the crude pigment preparatory to the muffling or calcining operation. The degree of drying (that is between bone dry and a moisture content of a few percent) has depended to some extent upon the character of the muffling or calcining apparatus, but I am aware of no commercial operation in which a moisture content exceeding about 10% could be tolerated in the crude lithopone introduced into the muffling or calcining apparatus. It has furthermore been customary in these prior practices to quench the pigment in water, immediately upon its discharge from the muffling or calcining operation, thereby forming a slurry or pulp of the pigment and necessitating subsequent operations of filtering, drying and disintegrating.

My present invention accordingly involves, in its broad aspect, carrying out the heat treatment of a pigment, such as lithopone, zinc sulfide, and the like, under a pressure considerably in excess of the atmospheric pressure. While the advantages of the invention are realized to some extent with pressures around 100 to 200 pounds per square inch, it is now my preferred practice to employ considerably higher pressures. In general, the higher the pressure to which the pigment is exposed during the heat treatment operation, the lower may be the temperature, or the shorter the duration of the treatment. Thus, lithopone and zinc sulphide receive substantially the equivalent heat treatment effect from exposure for about one hour to temperatures of about 600 to 500° C. under pressures of from 200 to 1000 pounds per square inch, as these pigments receive when exposed for the same time to temperatures of not less than 650° C. at approximately atmospheric pressure. When the heat treatment is carried out under pressures of from 2000 to 3000 pounds per square inch, the temperature (in the case of lithopone and zinc sulphide) may be in the neighborhood of 400 to 300° C. Under still higher pressures, the temperature required for heat treatment is correspondingly lower, and at extremely high pressures, say 10,000 pounds or more per square inch, the temperature required may be relatively low, or the duration of the heat treatment may be relatively short.

Accordingly, by the use of pressures of approximately 100 to 200 pounds per square inch, the heat treatment temperature may be lowered by approximately 50 to 100° C. Instead of lowering the heat treatment temperature, the length of time that the pigment is subjected to the heat treatment operation may be shortened. Where heat treatment temperatures in the neighborhood of 500 to 600° C. are required at pressures between 200 and 1000 pounds per square inch, it is necessary that the crude pigment introduced into the heat treatment apparatus be dry or almost dry, if no gas is allowed to escape from the apparatus. At considerably higher pressures, the required heat treatment temperature may be sufficiently low to make it possible to utilize a pressure corresponding to that of saturated steam at the required temperature of heat treatment. This is the case where pressures approximating 2500 to 3500 pounds per square inch are used, the temperature of superheated steam at these pressures (about 350° C.) being approximately the temperature required for the heat treatment of pigments such as lithopone and zinc sulphide. Under such conditions of pressure and temperature, it becomes possible to muffle a wet crude pigment pulp without first removing the water from it, and without providing for the escape of steam during the operation.

Where the required heat treatment temperature is much in excess of the temperature of saturated steam at the prevailing pressure, as is the case with lithopone and zinc sulfide at pressures below 2000 pounds per square inch, the heat treatment will ordinarily take place in an atmosphere of superheated steam. Under such circumstances, it is preferable to dry the crude pigment as completely as practicable before subjecting it to heat treatment. On the other hand, the crude pigment may be introduced into the heat treatment apparatus with a certain percentage of moisture, since the excess moisture may be readily bled off from the apparatus under the conditions of pressure and temperature contemplated by the invention. An aqueous pigment pulp or slurry may be heat treated in accordance with the invention without the evaporation of any water, when the required heat treatment temperature corresponds to that of superheated steam at the prevailing pressure. The use of solvents other than water makes possible the use of a different range of pressures and temperatures.

Where the heat treatment is conducted in the presence of no other gas than the vapor of the water (or other solvent) accompanying the pigment, the pressure attainable is limited to the vapor pressure of the liquid accompanying the pigment at the prevailing temperature. Higher pressures may, however, be attained by introducing into the heat treatment apparatus an inert gas under an appropriate pressure. By an inert gas I mean one that does not react with either the pigment or the vapor of the solvent. Nitrogen is in most cases an available gas for the purpose. By the use of such an inert gas under a suitable pressure, the heat treatment may be carried out under any desired condition of pressure and at any temperature required in practice.

It is my present preferred practice to provide the heat treatment apparatus with appropriate means, such as a blow-off valve, for the automatic discharge or escape therefrom of vapor or gas, such as steam, during the operation. A wet crude pigment may then be introduced into the heat treatment apparatus, and such an amount of vapor discharged from the apparatus, under conditions of pressure and temperature corresponding to those of the saturated vapor, as to permit the completion of the heat treatment in an atmosphere of the superheated vapor at the contemplated temperature and pressure. Thus, in the case of lithopone, the wet crude press cake (resulting from filter pressing of the crude pulp) containing approximately 50% water may be introduced into the heat treatment apparatus, which may be of the autoclave type with an appropriate automatic blow-off valve. The action of the blow-off valve serves to maintain an approximately constant pressure within the apparatus, while permitting the escape of the excess steam. As heat is initially applied, the temperature rises to approximately that of saturated steam at the prevailing pressure, and the continued application of heat serves to evaporate the water which escapes as steam through the blow-off valve until eventually an atmosphere of superheated steam is established within the apparatus. Under this atmosphere of superheated steam the temperature within the apparatus may be raised to that required for heat treatment at the established pressure.

That stage of the operation during which steam is discharged from the apparatus may be considered as in effect a drying treatment. Substantially little if any shrinkage takes place in the mass of the pigment when water is removed from it by evaporation during this stage of the heat treatment operation. The pigment thus preserves its original soft texture and particle sub-division, without that objectionable caking or hardening and cementing together of particles which occur in the heretofore customary drying operations.

Where the full effects of heat treatment are desired, equivalent to that obtained by the heretofore customary muffling or calcining operation in the case of paint pigments, the temperature must be sufficiently high to attain these effects at the prevailing pressure. For some purposes the pigment does not require the full effects of heat treatment, as, for example, where the pigment is to be used as a reinforcing agent or filler in compounded rubber or the like. In such cases, a lower temperature, or a shortened time of heat treatment at a given temperature, may be utilized. In practice that combination of pressure, temperature and duration of heat treatment should be chosen which best meets the particular conditions in hand.

Following the heat treatment operation, the pigment may be quenched in water as heretofore customary in the case of lithopone and zinc sulphide, or may be cooled in an inert gaseous atmosphere, or may be otherwise appropriately discharged from the heat treatment apparatus. Where the heat treatment has been carried out in an atmosphere of superheated steam (or other vapor), it is my preferred practice to suddenly release the pressure on the pigment (after the completion of heat treatment), as for example, by discharging the pigment into a chamber heated to a temperature slightly above 100° C. and maintained at approximately atmospheric pressure. Such a sudden release of pressure has the combined effect of drying the pigment and disintegrating its particles.

Pigments heat treated under pressure in accordance with the invention are characterized by extreme softness even when unmilled. Pigments such as lithopone and zinc sulphide heat treated in accordance with the invention are the equivalent, or even better, in tinting strength, color, brightness, and other pigment qualities, of pigments heat treated by the heretofore customary practices.

I claim:—

1. The improvement in the calcining treatment of a pigment associated with a liquid in an atmosphere containing vapor corresponding to said liquid, which comprises increasing the pressure of the atmosphere above the vapor pressure of the liquid at the prevailing temperature by introducing an inert gas into said atmosphere.

2. The improvement in the calcining treatment of a wet pigment which comprises calcining said wet pigment in a closed chamber and increasing the pressure within said chamber above the vapor pressure of the liquid associated with the pigment at the prevailing temperature by introducing an inert gas into said chamber.

3. The improvement in the calcining treatment of a pigment in an atmosphere containing water vapor which comprises increasing the pressure of said atmosphere above the vapor pressure of water at the prevailing temperature by introducing an inert gas into said atmosphere.

4. The improvement in the calcining treatment of a zinc-containing pigment in an atmosphere containing water vapor which comprises introducing an inert gas into said atmosphere to raise the pressure of the atmosphere above the vapor pressure of water at the prevailing temperature.

5. The improvement in a calcining treatment for pigments containing zinc sulfide in an atmosphere containing water vapor, which comprises increasing the pressure of said atmosphere above the vapor pressure of water at the prevailing temperature by introducing an inert gas into said atmosphere.

6. A calcining process for pigments containing zinc sulfide which comprises calcining the pigment in a closed chamber in an atmosphere containing steam and increasing the pressure within the chamber above the vapor pressure of water at the prevailing temperature by introducing nitrogen into the chamber.

GEORGE F. A. STUTZ.